(12) United States Patent
Lamberti et al.

(10) Patent No.: US 11,746,708 B2
(45) Date of Patent: *Sep. 5, 2023

(54) REMOTE UPDATES OF A GAS TURBINE ENGINE

(71) Applicant: Raytheon Technologies Corporation, Farmington, CT (US)

(72) Inventors: William C. Lamberti, Wethersfield, CT (US); Paul Raymond Scheid, West Hartford, CT (US); Jason E. Posniak, Broad Brook, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,288

(22) Filed: Sep. 8, 2022

(65) Prior Publication Data

US 2023/0003173 A1 Jan. 5, 2023

Related U.S. Application Data

(63) Continuation of application No. 16/839,111, filed on Apr. 3, 2020, now Pat. No. 11,441,489.

(Continued)

(51) Int. Cl.
*F02C 9/00* (2006.01)
*G06F 8/65* (2018.01)
*H04W 12/06* (2021.01)

(52) U.S. Cl.
CPC ............... *F02C 9/00* (2013.01); *G06F 8/65* (2013.01); *H04W 12/06* (2013.01); *F05D 2270/44* (2013.01); *F05D 2270/54* (2013.01)

(58) Field of Classification Search
CPC .. F02C 9/00; G06F 8/65; H04W 12/06; F05D 2270/44; F05D 2270/54
(Continued)

(56) References Cited

U.S. PATENT DOCUMENTS 6,167,239 A 12/2000 Wright et al.
6,173,159 B1 1/2001 Wright et al.
(Continued)

FOREIGN PATENT DOCUMENTS

EP 1400942 A2 3/2004
EP 2378490 A1 10/2011
(Continued)

OTHER PUBLICATIONS

Sampigethaya et al, "Security and Privacy of Future Aircraft Wireless Communications with Offboard Systems", 2011, [Online], pp. 1-6, [Retrieved from internet on Mar. 30, 2023], <https://ieeexplore.ieee.org/stamp/stamp.jsp?arnumber=5716527> (Year: 2011).*

(Continued)

*Primary Examiner* — S. Sough
*Assistant Examiner* — Zengpu Wei
(74) *Attorney, Agent, or Firm* — CANTOR COLBURN LLP

(57) ABSTRACT

A communication adapter of a gas turbine engine of an aircraft includes a communication interface configured to wirelessly communicate with an offboard system and to communicate with an engine control of the gas turbine engine. The communication adapter also includes a memory system and processing circuitry configured to receive one or more configuration items from the offboard system, confirm an authentication between the communication adapter and the engine control, apply a cryptographic algorithm using one or more parameters received and cryptographic information to decrypt the one or more configuration items, (Continued)

wherein the cryptographic information includes a combination of received cryptographic information and previously stored cryptographic information, and transfer the one or more configuration items to the engine control based on the authentication.

20 Claims, 4 Drawing Sheets

Related U.S. Application Data

(60) Provisional application No. 62/835,169, filed on Apr. 17, 2019.

(58) Field of Classification Search
USPC .......................................................... 717/172
See application file for complete search history.

(56) References Cited

U.S. PATENT DOCUMENTS

| | | |
|---|---|---|
| 8,078,354 B2 | 12/2011 | Loda |
| 8,344,912 B2 | 1/2013 | Mitchell et al. |
| 8,768,537 B2 | 7/2014 | Kim et al. |
| 9,253,816 B1 | 2/2016 | Gashette |
| 9,303,523 B2 | 4/2016 | Rodriguez et al. |
| 9,367,970 B2 | 6/2016 | Ziarno |
| 9,435,819 B1 | 9/2016 | Fraley et al. |
| 9,464,905 B2 | 10/2016 | Lewis |
| 9,587,576 B2 | 3/2017 | Stanek et al. |
| 9,915,535 B2 | 3/2018 | Jordan et al. |
| 10,035,609 B2 | 7/2018 | Ziarno |
| 10,093,436 B2 | 10/2018 | Bulumulla et al. |
| 10,114,634 B2 | 10/2018 | Quin et al. |
| 10,444,748 B2 | 10/2019 | Feenstra et al. |
| 10,633,106 B2 | 4/2020 | Gelwan et al. |
| 10,880,070 B1 | 12/2020 | Delaney et al. |
| 2001/0038143 A1 | 11/2001 | Sonobe et al. |
| 2004/0056766 A1 | 3/2004 | Butz et al. |
| 2004/0206818 A1 | 10/2004 | Loda et al. |
| 2005/0017876 A1 | 1/2005 | Ziarno |
| 2006/0108988 A1 | 5/2006 | McKelvey et al. |
| 2007/0118626 A1* | 5/2007 | Langen .................... G06F 8/65 709/221 |
| 2009/0049441 A1 | 2/2009 | Mii et al. |
| 2009/0119657 A1 | 5/2009 | Link, II |
| 2010/0049377 A1 | 2/2010 | Scheid et al. |
| 2013/0006581 A1 | 1/2013 | Singh et al. |
| 2013/0332011 A1 | 12/2013 | Ziarno |
| 2013/0332025 A1 | 12/2013 | Ziarno |
| 2014/0123625 A1 | 5/2014 | Snell |
| 2015/0330869 A1 | 11/2015 | Ziarno |
| 2016/0110179 A1 | 4/2016 | Weckesser et al. |
| 2016/0178464 A1 | 6/2016 | Burns et al. |
| 2016/0196457 A1 | 7/2016 | Mylaraswamy et al. |
| 2016/0207639 A1 | 7/2016 | Ellis et al. |
| 2016/0222889 A1 | 8/2016 | Snyder |
| 2016/0260265 A1 | 9/2016 | Buehler et al. |
| 2016/0322826 A1 | 11/2016 | Okino et al. |
| 2016/0377506 A1 | 12/2016 | Bizud |
| 2017/0089577 A1 | 3/2017 | Desilva et al. |
| 2017/0155514 A1 | 6/2017 | Schulz et al. |
| 2017/0205817 A1 | 7/2017 | Lyons et al. |
| 2017/0234233 A1 | 8/2017 | Schwarz et al. |
| 2017/0259942 A1 | 9/2017 | Ziarno |
| 2017/0287239 A1 | 10/2017 | Levy |
| 2017/0334576 A1 | 11/2017 | Shams |
| 2017/0373612 A1 | 12/2017 | Sellinger et al. |
| 2018/0006916 A1 | 1/2018 | Scholten et al. |
| 2018/0007136 A1 | 1/2018 | Scholten et al. |
| 2018/0011481 A1 | 1/2018 | Smit et al. |
| 2018/0023413 A1 | 1/2018 | Chowdhury et al. |
| 2018/0023484 A1 | 1/2018 | Gelwan et al. |
| 2018/0045122 A1 | 2/2018 | Veilleux |
| 2018/0051587 A1 | 2/2018 | Fletcher |
| 2018/0167391 A1 | 6/2018 | Lawson et al. |
| 2018/0170575 A1 | 6/2018 | Ziarno |
| 2018/0205658 A1 | 7/2018 | Sullivan |
| 2018/0225629 A1 | 8/2018 | Brodersen et al. |
| 2018/0297718 A1 | 10/2018 | Adibhatla |
| 2018/0365265 A1 | 12/2018 | Blanc et al. |
| 2019/0005744 A1 | 1/2019 | Curtis et al. |
| 2019/0012853 A1 | 1/2019 | Scholten et al. |
| 2019/0102162 A1 | 4/2019 | Pitre et al. |
| 2019/0128191 A1 | 5/2019 | Moravek et al. |
| 2019/0322299 A1 | 10/2019 | Mong et al. |
| 2019/0367190 A1 | 12/2019 | Bewlay et al. |
| 2019/0385057 A1 | 12/2019 | Litichever et al. |
| 2019/0385120 A1 | 12/2019 | Yund et al. |
| 2020/0044916 A1 | 2/2020 | Kaufman et al. |
| 2020/0076596 A1 | 3/2020 | Chopart |
| 2020/0331620 A1 | 10/2020 | Scheid |
| 2020/0332675 A1 | 10/2020 | Scheid et al. |
| 2020/0332722 A1 | 10/2020 | Lamberti et al. |
| 2020/0333004 A1 | 10/2020 | Scheid et al. |
| 2020/0334925 A1 | 10/2020 | Scheid et al. |
| 2020/0362766 A1 | 11/2020 | Lamberti et al. |
| 2020/0378271 A1 | 12/2020 | Lamberti et al. |
| 2020/0380508 A1 | 12/2020 | Sheriff |
| 2021/0209868 A1 | 7/2021 | Scheid et al. |
| 2022/0216910 A1 | 7/2022 | Lamberti et al. |
| 2022/0394093 A1 | 12/2022 | Lamberti et al. |

FOREIGN PATENT DOCUMENTS

| | | |
|---|---|---|
| EP | 3217364 A2 | 9/2017 |
| EP | 3260939 A1 | 12/2017 |
| WO | 2010028729 A1 | 3/2010 |
| WO | 2018158102 A1 | 9/2018 |

OTHER PUBLICATIONS

Baek et al., "Making air traffic surveillance more reliable: a new authentication framework for automatic dependent surveillance-broadcast (ADS-B) based on online/offline identity-based signature", Security Comm. Networks 2015; 8: 740-750.

Cfmi Customer Training Center Snecma: Training Manual CFM56-5A Engine Systems;dated Apr. 1, 2020; https://eduscol.education.fr/sti/sites/eduscol.education.fr.sti/files/ressources/pedagogiques/11659/11659-ctc-045-engine-systems.pdf, 467 pages.

Extended European Search Report; dated Aug. 24, 2020; EP Application No. 20170086.1-1009; 11 pages.

Extended European Search Report; dated Sep. 8, 2020; Application No. 20167253.2-1202; 10 pages.

Extended European Search Report; dated Aug. 24, 2020; Application No. 20167171.6-1202; 8 pages.

Extended European Search Report; dated Oct. 2, 2020; Application No. 20170071.3-1202; 11 pagaes.

Extended European Search Report; dated Sep. 25, 2020; Application No. 20170066.3-1009; 12 pages.

Extended European Search Report; dated Sep. 8, 2020; Application No. 20167178.1-1202; 9 pages.

Extended European Search Report; Sep. 18, 2020; Application No. 20167001.5-1009; 9 pages.

Partial European Search Report; Application No. 20170098.6-1202; dated Sep. 21, 2020; 16 pages.

U.S. Appl. No. 16/839,108, filed Apr. 3, 2020, NonFinal Office Action, dated Mar. 1, 2022, 48 pages.

* cited by examiner

REMOTE UPDATES OF A GAS TURBINE ENGINE

CROSS-REFERENCE TO RELATED APPLICATION

This application is a continuation of U.S. application Ser. No. 16/839,111 filed Apr. 3, 2020, which claims the benefit of priority to U.S. Provisional Application No. 62/835,169 filed Apr. 17, 2019, the disclosures of which are incorporated herein by reference in their entirety.

BACKGROUND

The subject matter disclosed herein generally relates to gas turbine engine communication systems and, more particularly, to a gas turbine engine with a remote update capability.

A control system of a gas turbine engine uses multiple configuration control items, such as control software, data, trim updatable values, and the like to control operation of the gas turbine engine and monitor performance of the gas turbine engine. Once a gas turbine engine is deployed in the field, it can be difficult to access data captured and/or computed by the control system and to make updates to the configuration control items. A gas turbine engine can be deployed in the field for an extended service life, such as a period of decades. Computer system technology and communication technology can evolve at a rapid pace adding to the challenges of interfacing with offboard systems as the offboard technology continues to advance during the lifespan of the engine.

BRIEF DESCRIPTION

According to one embodiment, a communication adapter of a gas turbine engine of an aircraft includes a communication interface configured to wirelessly communicate with an offboard system and to communicate with an engine control of the gas turbine engine. The communication adapter also includes a memory system and processing circuitry configured to receive one or more configuration items from the offboard system, confirm an authentication between the communication adapter and the engine control, apply a cryptographic algorithm using one or more parameters received and cryptographic information to decrypt the one or more configuration items, wherein the cryptographic information includes a combination of received cryptographic information and previously stored cryptographic information, and transfer the one or more configuration items to the engine control based on the authentication.

In addition to one or more of the features described above or below, or as an alternative, further embodiments may include where the processing circuitry is further configured to transmit a data state of the engine control and a configuration of the engine control to the offboard system with the update completion confirmation.

In addition to one or more of the features described above or below, or as an alternative, further embodiments may include where the one or more configuration items include a plurality of engine control trim data.

In addition to one or more of the features described above or below, or as an alternative, further embodiments may include where the engine control trim data includes at least one digital signature that is validated by the engine control prior to updating the engine control.

In addition to one or more of the features described above or below, or as an alternative, further embodiments may include where the one or more configuration items include a plurality of fault limit data.

In addition to one or more of the features described above or below, or as an alternative, further embodiments may include where the one or more configuration items include executable software for the engine control.

In addition to one or more of the features described above or below, or as an alternative, further embodiments may include where the executable software includes at least one digital signature that is validated by the engine control prior to updating the engine control.

According to an embodiment, a method includes receiving one or more configuration items from an offboard system at a communication adapter of a gas turbine engine of an aircraft. An authentication is confirmed between the communication adapter and an engine control. A cryptographic algorithm using one or more parameters received and cryptographic information is applied to decrypt the one or more configuration items, where the cryptographic information includes a combination of received cryptographic information and previously stored cryptographic information. The one or more configuration items are transferred to the engine control based on the authentication. An update completion confirmation of the engine control is transmitted from the communication adapter to the offboard system based on a confirmation message from the engine control.

In addition to one or more of the features described above or below, or as an alternative, further embodiments may include transmitting a data state of the engine control and a configuration of the engine control to the offboard system with the update completion confirmation.

According to an embodiment, a gas turbine engine of an aircraft includes a fan section with a fan case, an engine control, and a communication adapter mounted on the fan case. The engine control is configured to monitor and control operation of the gas turbine engine in real-time. The communication adapter includes processing circuitry configured to receive one or more configuration items from an offboard system, confirm an authentication between the communication adapter and the engine control, apply a cryptographic algorithm using one or more parameters received and cryptographic information to decrypt the one or more configuration items, wherein the cryptographic information includes a combination of received cryptographic information and previously stored cryptographic information, and transfer the one or more configuration items to the engine control based on the authentication.

In addition to one or more of the features described above or below, or as an alternative, further embodiments may include where the one or more configuration items include a plurality of engine control trim data with at least one digital signature that is validated by the engine control prior to updating the engine control.

A technical effect of the apparatus, systems and methods is achieved by incorporating communication features to securely update and interface an engine control system with offboard systems as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
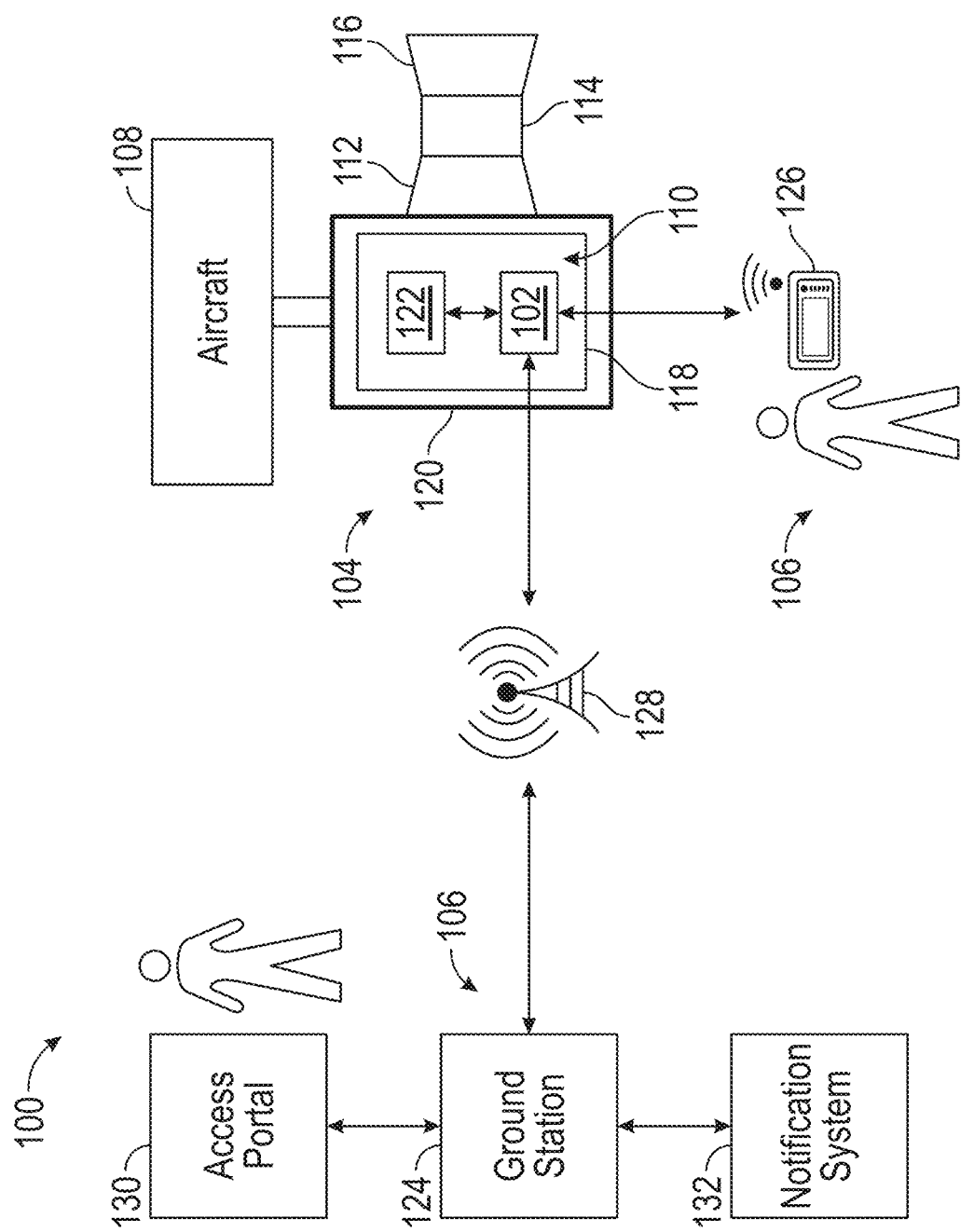
FIG. 1 is a block diagram of a system supporting wireless communication between an engine and offboard systems, in accordance with an embodiment of the disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and communication into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118 and covered by the cowling 120. The engine control 122 is configured to monitor and control operation of the gas turbine engine 104 in real-time. In order to transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the communication adapter 102, also referred to as a gas turbine engine communication gateway, is configured to establish communication with the engine control 122 and wireless communication with one or more offboard systems 106 external to the aircraft 108. Similar to the engine control 122, the communication adapter 102 can be mounted on the fan case 118 and covered by the cowling 120 of the gas turbine engine 104. Wireless communication can alleviate the need for customized cables or physically opening the cowling 120 to establish communication with the offboard systems 106.

The offboard systems 106 can include, for example, a ground station 124, a near-wing maintenance computer 126, an access portal 130, and/or other devices (not depicted) that may establish one-way or two-way wireless communication with the communication adapter 102. For example, a global positioning system (GPS) can provide one-way wireless signaling to the communication adapter 102 to assist in confirming a geographic location of the gas turbine engine 104 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. Wireless communication between the communication adapter 102 and the offboard systems 106 can be direct or indirect. For instance, wireless communication between the communication adapter 102 and ground station 124 may pass through one or more network interface components 128, such as a repeater, while wireless communication between the communication adapter 102 and the near-wing maintenance computer 126 may be direct wireless communication without any relay components.

The ground station 124 can enable communication with a variety of support systems, such as an access portal 130 that enables authorized users to access data, initiate tests, configure software, and perform other actions with respect to the engine control 122, where the communication adapter 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the communication adapter 102 for fault data, test parameters, and other such information. In some embodiments, the near-wing maintenance computer 126 can be authorized with limited authority to make updates to select configuration parameters or data collection parameters of the communication adapter 102.

Figure 2:
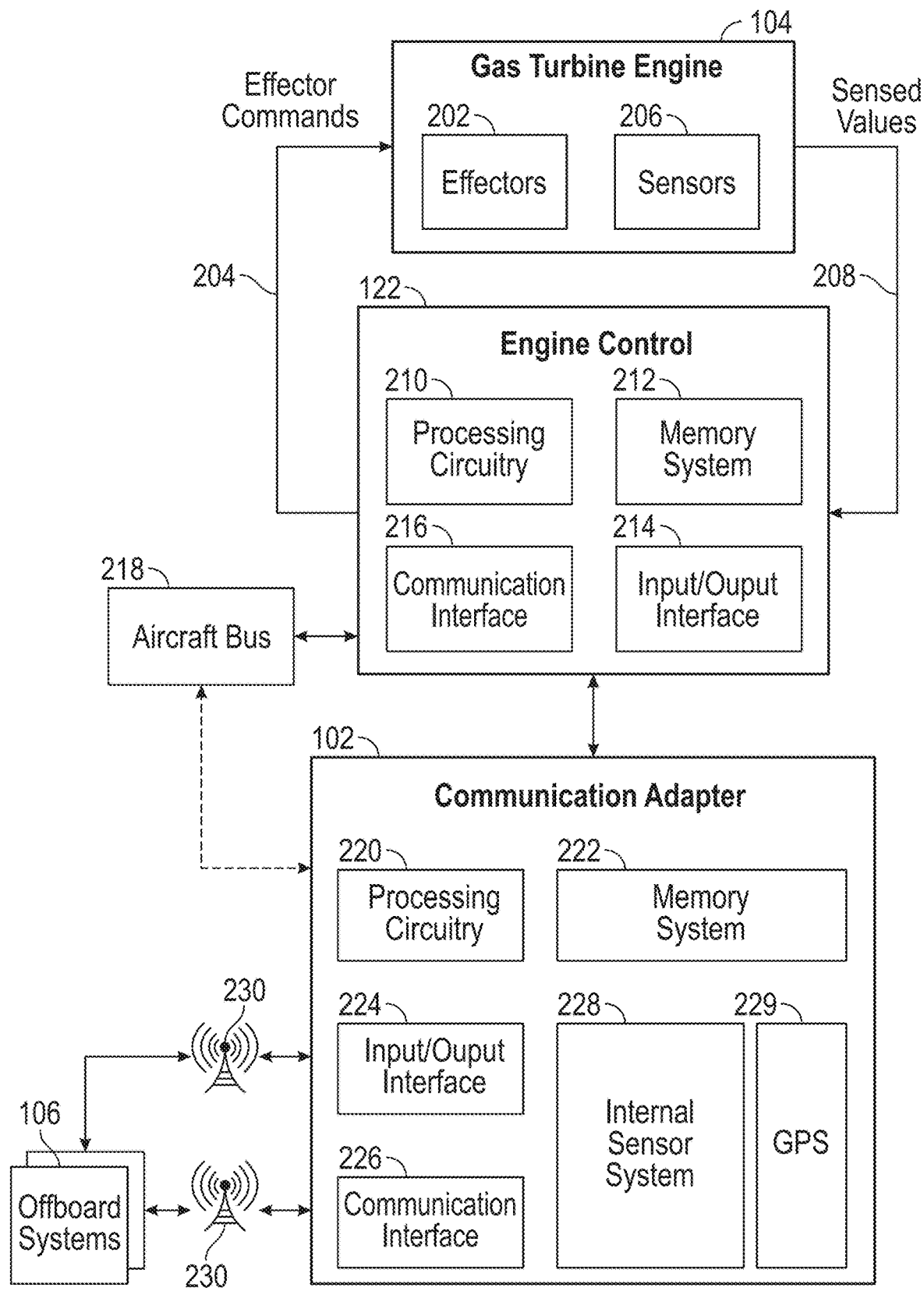
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to enable closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements (not depicted). The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form. The communication adapter 102 can also include an internal sensor system 228. The internal sensor system 228 can include, for example, one or more accelerometers, gyroscopes, barometers, a magnetometer (e.g., a compass), and other such sensors. Further, the communication adapter 102 can include other devices, such as a GPS 229. The input/output interface 224 can process data collected from the internal sensors 228 and condition the data in a format usable by the processing circuitry 220. The communication interface 226 can interface with one or more antennas 230, which may be integrated with the communication adapter 102 or located remotely from the communication adapter 102, e.g., a shark-fin antenna mounted under or on the cowling 120 of FIG. 1.

The communication adapter 102 can act as a secure communication gateway with respect to the offboard systems 106. For example, the offboard systems 106 can request to load new/updated configuration items to the memory system 212 of the engine control 122 through the communication adapter 102. The communication interface 216 of the engine control 122 can interface to the communication interface 226 of the communication adapter 102 through a wired, optical, or magnetic coupling. The communication interface 226 can communicate wirelessly through one or more antennas 230 to the offboard systems 106. The communication interface 226 may also have access to receive data directly from the aircraft bus 218 in some embodiments.

In alternate embodiments, the communication adapter 102 can send a request to the engine control 122 to provide aircraft parameters received via the aircraft bus 218 and/or engine parameters computed by the engine control 122.

The communication adapter 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212.

Configuration items received for the engine control 122 and/or the communication adapter 102 may be encrypted using various cryptographic methods to further enhance security. For example, the communication adapter 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication adapter 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control 122 upon authentication.

Separating the communication adapter 102 from the engine control 122 can enable the communication adapter 102 and the engine control 122 to have different expected service life durations. For example, to stay compatible with changes in wireless communication technologies used by the offboard systems 106, the communication adapter 102 may be upgraded at a faster interval than the engine control 122. The communication adapter 102 can have a lower processing and storage capacity than the engine control 122 to reduce power requirements, weight, and other costs associated with the communication adapter 102. Since the communication adapter 102 does not actively control the gas turbine engine 104, development cycles may be reduced as compared to implementing flight critical control algorithms and hardware of the engine control 122.

Figure 3:
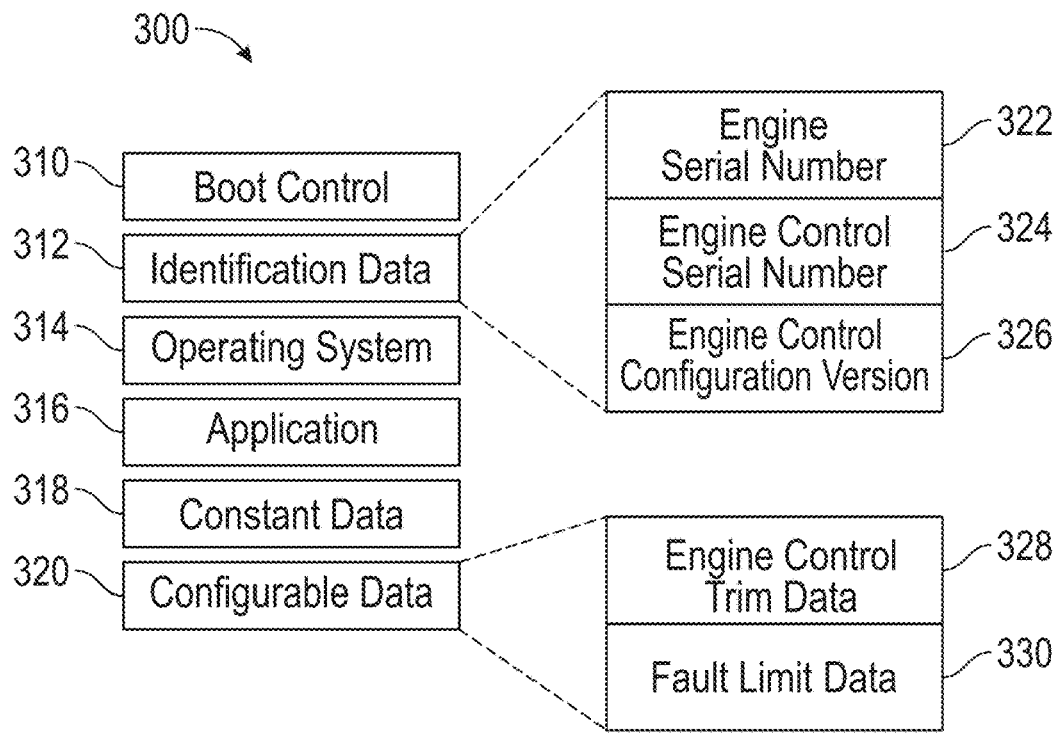
FIG. 3 is a block diagram of configuration items of an engine control, in accordance with an embodiment of the disclosure.

FIG. 3 is a block diagram of configuration items 300 of the engine control 122 of FIG. 1, in accordance with an embodiment of the disclosure. The configuration items 300 can include one or more of a boot control 310, identification data 312, an operating system 314, an application 316, constant data 318, and/or configurable data 320. Further, there can be multiple instances of the configuration items 300, such as multiple instances of the application 316, constant data 318, configurable data 320, and/or other items. The configuration items 300 can have different levels of criticality and authentication required. The boot control 310 can manage the loading and/or initialization of other configuration items 300. The identification data 312 can define a number of configuration identifiers to confirm items such as an engine serial number 322, an engine control serial number 324, an engine control configuration version 326, and other such identifiers. The operating system 314 can provide scheduling and support for one or more applications 316 to interface with various hardware elements of the engine control 122 of FIG. 1. One or more applications 316 that use constant data 318 and/or configurable data 320 can be invoked by the operating system 314. The application 316 can be, for example, configured to control operation of the gas turbine engine 104 of FIG. 1. The configurable data 320 can include adjustable parameters to tune monitoring performance and control performance of the engine control 122, such as engine control trim data 328 and fault limit data 330. In embodiments, a subset of the configuration items 300 can be stored in memory devices of the memory system 212 of FIG. 2 that are internal or external to the engine control 122. For example, the memory system 212 can include supplemental data storage, such as a data storage unit or programming plug to store configuration information, such as the identification data 312 and/or the configurable data 320. Supplemental data storage can be accessed through an alternate memory interface, such as a serial interface of the engine control 122 rather than a primary memory bus of the engine control 122 that may be used to access executable instructions of the configuration items 300 and/or various types of data.

Figure 4:
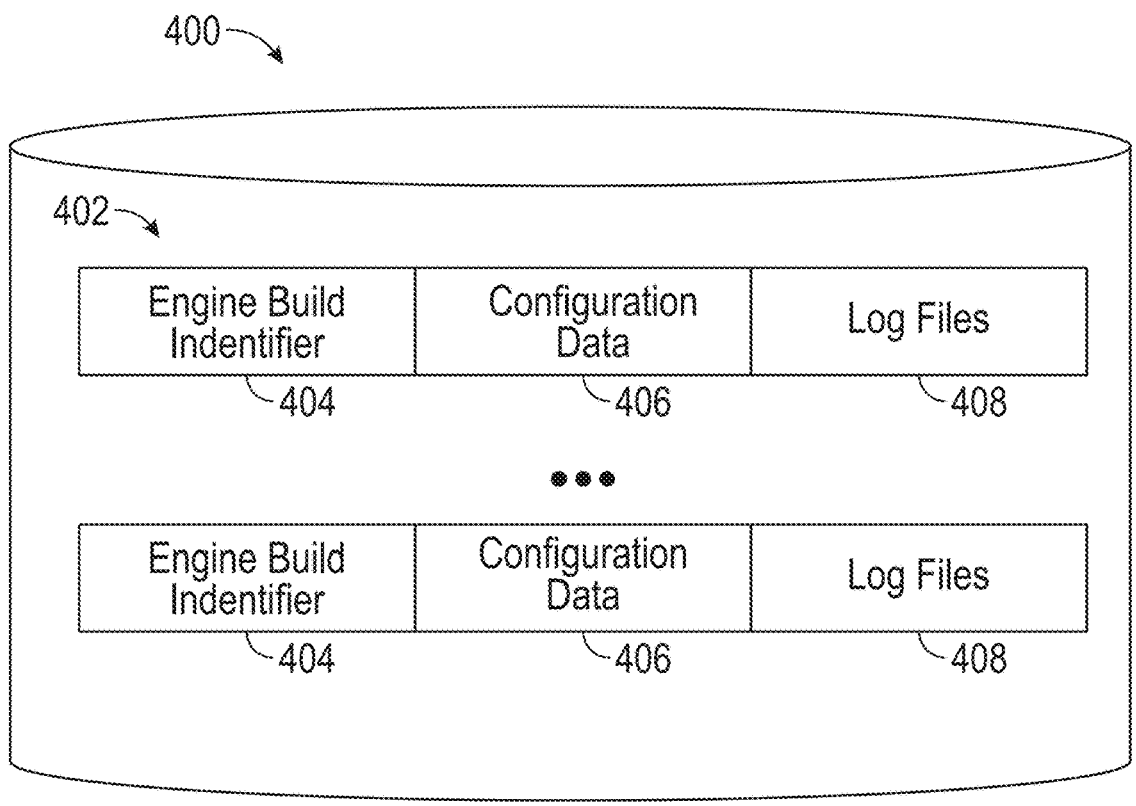
FIG. 4 is a block diagram of a configuration management database of an offboard system to track multiple engine configurations, in accordance with an embodiment of the disclosure.

FIG. 4 is a block diagram of a configuration management database 400 of an offboard system 106 of FIG. 1 to track multiple engine configurations, in accordance with an embodiment of the disclosure. For example, the configuration management database 400 can be stored at or accessible by the ground station 124 of FIG. 1 to track and verify the configuration of multiple instances of the gas turbine engine 104 of FIG. 1 and/or changes to a specific instance of the gas turbine engine 104 over a period of time. The configuration management database 400 can include, for example, a plurality of configuration records 402 that correlate data such as engine build identifier 404, configuration data 406, and log filed 408. The engine build identifier 404 can identify specific engine configurations and the configuration data 406 can include detailed data and software configuration items. For instance, the configuration data 406 may include copies or links to one or more of the configuration items 300 of FIG. 3 associated with an instance or group of gas turbine engines 104. The log files 408 can include data extracted from the communication adapter 102 of FIG. 1, which may include data locally collected by the communication adapter 102, the engine control 122 of FIG. 1, and/or the aircraft bus 218 of FIG. 2. The configuration data 406 and log files 408 may be access restricted and incorporate various security features, such as authentication requirements, encryption, digital signatures, and the like.

Figure 5:
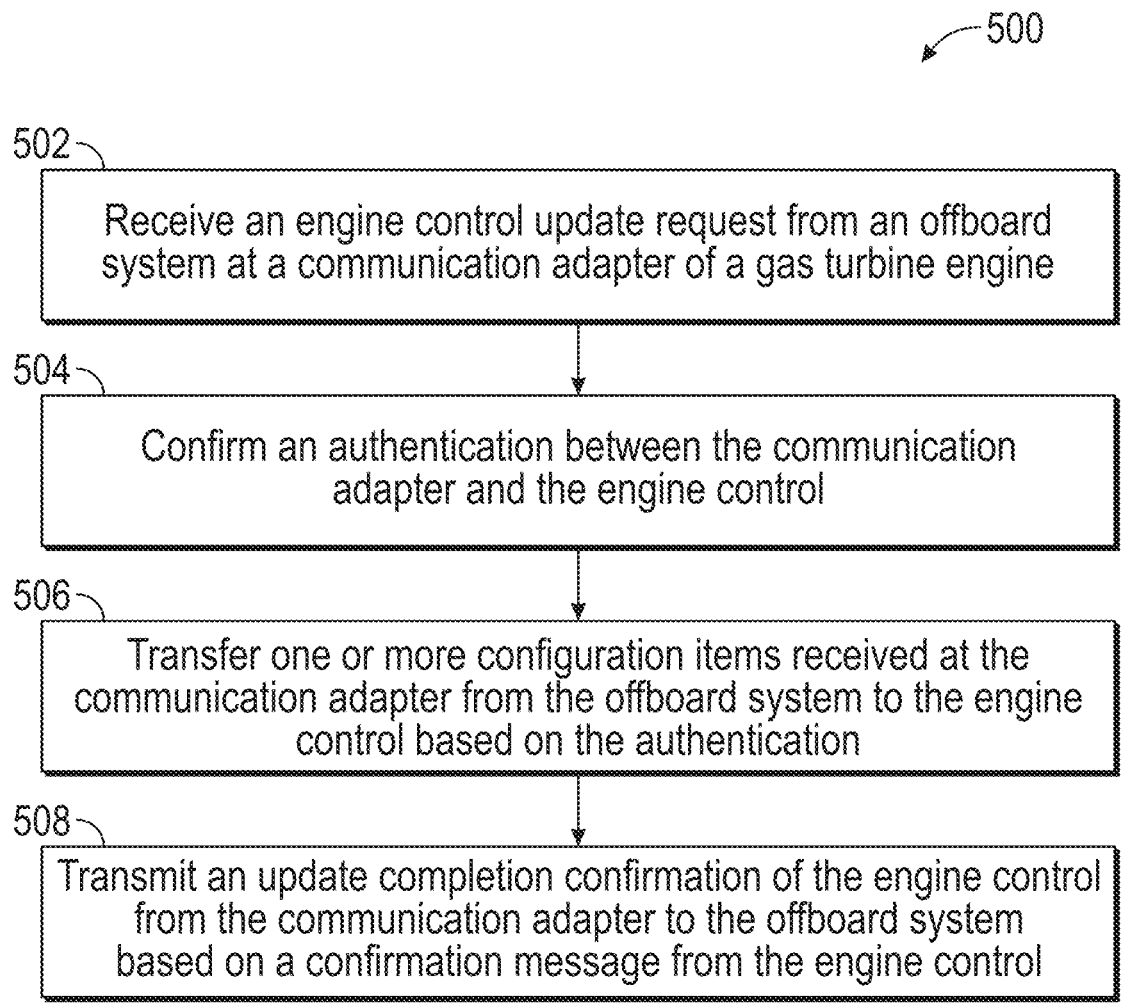
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for using the communication adapter 102 of FIG. 1, in accordance with an embodiment. The method 500 may be performed, for example, by the communication adapter 102 in conjunction with the engine control 122 of FIG. 1 and at least one of the offboard systems 106 of FIG. 1.

At block 502, the communication adapter 102 can receive an engine control update request from an offboard system 106.

At block 504, the communication adapter 102 can confirm an authentication between the communication adapter 102 and the engine control 122. Authentication may include verifying a shared secret or other credential between the communication adapter 102 and the engine control 122. Further, user type credentials can be used to verify a level of access granted to update specific portions of the memory system 212 of the engine control 122.

At block 506, the communication adapter 102 can transfer one or more configuration items 300 received at the communication adapter 102 from the offboard system 106 to the engine control 122 based on the authentication. Examples of the configuration items 300 can include executable software for the engine control 122, such as boot control 310, operating system 314, and/or application 316. Further, the configuration items 300 may include identification data 312, constant data 318, and/or configurable data 320, such as engine control trim data 328 and/or fault limit data 330.

At block 508, the communication adapter 102 can transmit an update completion confirmation of the engine control 122 from the communication adapter 102 to the offboard system 106 based on a confirmation message from the engine control 122. The confirmation message from the engine control 122 can be sent based on validation of at least one digital signature associated with the configuration items 300 prior to updating the engine control 122. For instance, the configuration items 300 to be updated may be digitally signed at the offboard system 106 and the digitally-signed configuration items 300 can pass through the communication adapter 102 after authentication to the engine control 122 for validation. Processing circuitry 220 of the communication adapter 102 can be further configured to transmit a data state of the engine control 122 and a configuration of the engine control 122 to the offboard system 106 with the update completion confirmation. Confirmations may include a success or failure status to assist in troubleshooting unsuccessful upload attempts. The offboard system 106 can store results and state data, such as a load state and configuration, into the configuration management database 400 (e.g., as part of the configuration data 406 and/or log files 408 associated with an engine build identifier 404).

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A communication adapter of a gas turbine engine of an aircraft, the communication adapter comprising:
a communication interface configured to wirelessly communicate with an offboard system and to communicate with an engine control of the gas turbine engine;
a memory system; and
processing circuitry configured to:
receive one or more configuration items from the offboard system;
confirm an authentication between the communication adapter and the engine control;
apply a cryptographic algorithm using one or more parameters received and cryptographic information to decrypt the one or more configuration items, wherein the cryptographic information includes a combination of received cryptographic information and previously stored cryptographic information; and
transfer the one or more configuration items to the engine control based on the authentication.

2. The communication adapter of claim 1, wherein the processing circuitry is further configured to:
transmit a data state of the engine control and a configuration of the engine control to the offboard system with an update completion confirmation.

3. The communication adapter of claim 1, wherein the one or more configuration items comprise a plurality of engine control trim data.

4. The communication adapter of claim 3, wherein the engine control trim data comprises at least one digital signature that is validated by the engine control prior to updating the engine control.

5. The communication adapter of claim 1, wherein the one or more configuration items comprise a plurality of fault limit data.

6. The communication adapter of claim 1, wherein the one or more configuration items comprise executable software for the engine control.

7. The communication adapter of claim 6, wherein the executable software comprises at least one digital signature that is validated by the engine control prior to updating the engine control.

8. A method comprising:
receiving one or more configuration items from an offboard system at a communication adapter of a gas turbine engine of an aircraft;
confirming an authentication between the communication adapter and an engine control;
applying a cryptographic algorithm using one or more parameters received and cryptographic information to decrypt the one or more configuration items, wherein the cryptographic information includes a combination of received cryptographic information and previously stored cryptographic information; and
transferring the one or more configuration items to the engine control based on the authentication.

9. The method of claim 8, further comprising:
transmitting a data state of the engine control and a configuration of the engine control to the offboard system with an update completion confirmation.

10. The method of claim 8, wherein the one or more configuration items comprise a plurality of engine control trim data.

11. The method of claim 10, wherein the engine control trim data comprises at least one digital signature that is validated by the engine control prior to updating the engine control.

12. The method of claim 8, wherein the one or more configuration items comprise a plurality of fault limit data.

13. The method of claim 8, wherein the one or more configuration items comprise executable software for the engine control.

14. The method of claim 13, wherein the executable software comprises at least one digital signature that is validated by the engine control prior to updating the engine control.

15. A gas turbine engine of an aircraft, the gas turbine engine comprising:
a fan section comprising a fan case;
an engine control configured to monitor and control operation of the gas turbine engine in real-time; and
a communication adapter mounted on the fan case, the communication adapter comprising processing circuitry configured to receive one or more configuration items from an offboard system, confirm an authentication between the communication adapter and the engine control, apply a cryptographic algorithm using one or more parameters received and cryptographic information to decrypt the one or more configuration items, wherein the cryptographic information includes a combination of received cryptographic information and previously stored cryptographic information, and transfer the one or more configuration items to the engine control based on the authentication.

16. The gas turbine engine of claim 15,
wherein processing circuitry is further configured to:
transmit a data state of the engine control and a configuration of the engine control to the offboard system with an update completion confirmation.

17. The gas turbine engine of claim 15, wherein the one or more configuration items comprise a plurality of engine control trim data with at least one digital signature that is validated by the engine control prior to updating the engine control.

18. The gas turbine engine of claim 15, wherein the one or more configuration items comprise a plurality of fault limit data.

19. The gas turbine engine of claim 15, wherein the one or more configuration items comprise executable software for the engine control.

20. The gas turbine engine of claim 19, wherein the executable software comprises at least one digital signature that is validated by the engine control prior to updating the engine control.

* * * * *